3,439,025
PROCESS FOR PURIFYING NYLON SALT SOLUTION
Ralph Gallay, Haifa, Israel, and Samuel Peter La Penta, Richmond, Va., assignors to E. I. du Pont de Nemours and Company, Wilmington, Del., a corporation of Delaware
No Drawing. Continuation-in-part of application Ser. No. 332,968. Dec. 23, 1963. This application July 8, 1965, Ser. No. 470,569
Int. Cl. C01b *31/02*
U.S. Cl. 260—501.2                                 5 Claims

ABSTRACT OF THE DISCLOSURE

Process for the treatment of activated carbon used in the purification of a nylon salt solution wherein the carbon is washed with an aliphatic dibasic acid and thereafter with a diamine, said dibasic acid and diamine being those used to prepare the nylon salt.

---

This application is a continuation-in-part of applicants' copending application Ser. No. 332,968, filed Dec. 23, 1963, now abandoned.

This invention relates to a process for purification of nylon salt solutions to be used in the production of polyamides, and more particularly to a process of treating the activated carbon to be used in the purification of nylon salt solutions.

In the production of synthetic linear polyamides from diamines and dibasic acids, the first step is the combination, in aqueous solution, of approximately equal molar amounts of the diamine and the dibasic acid to form the corresponding salt. The salt solution is usually purified to remove traces of organic impurities by contacting activated carbon with the salt solution. The solution is then evaporated to the desired concentration and subjected to heat and pressure to form a polymer of the desired molecular weight.

It has been observed that when a fresh batch of activated carbon is put into use, the viscosity of the polymer prepared from the salt solution purified with the new carbon decreases shortly after the new carbon is put into use and then rises again after a period of two to three days. This decrease in viscosity, which reflects a reduction in molecular weight, is highly undesirable from the standpoint of producing a uniformly high-grade polymer for the production of textile or industrial fibers or for other end uses. Also it has been found that, when fresh carbon is put into use, the first salt solution processed contains an undesirably high concentration of metal contaminants. The presence of appreciable amounts of these metal contaminants, such as manganese, calcium and iron, leads to poor spinning performance and is consequently deleterious to yarn properties.

It has now been found that the undesirable decrease in viscosity can be eliminated and the concentration of metal contaminants reduced by modifying the salt purification procedure. This is accomplished in accordance with the present invention by the improvement comprising washing the activated carbon, prior to contacting it with a nylon salt solution formed by reaction of approximately equal molar quantities of dibasic acid and diamine, (1) with an aqueous solution of said dibasic acid and (2) with sufficient aqueous solution of said diamine to neutralize the dibasic acid present in the activated carbon.

In carrying out the process of this invention, the contacting of the carbon with dibasic acid and diamine prior to passage of the salt solution therethrough may be accomplished in any one of a number of ways. The carbon may be washed by mixing it with dibasic acid or diamine solution as a slurry and the solution drained off or a bed of carbon may be soaked with the solution and the solution drained away. Alternatively, dibasic acid or diamine solution may be slowly passed through a bed or column of the carbon to accomplish the desired results. The latter procedure, which is illustrated below in Example II, is usually the preferred method from a standpoint of economical operation.

The amount of aqueous solution of dibasic acid required and the time of contact with the carbon will vary depending on the quality of the activated carbon employed. In general, however, where the soak-and-drain method is used, at least three soaking periods of at least 0.5 hour should be used with at least 5 pounds of dibasic acid solution per pound of carbon. The concentration of dibasic acid in the aqueous solution is usually sufficient to provide substantially saturated solution but in any event a dilute aqueous solution of at least about 0.5% by weight of dibasic acid should be present.

Usually a single treatment of the carbon with diamine is adequate, provided that the soaking or other treatment is of sufficient duration and under conditions such that the dibasic acid is completely neutralized. Preferably, where the soak-and-drain method is used, the carbon is soaked for a period of at least 4 hours with at least 5 pounds of diamine solution per pound of carbon. Preferably, a saturated aqueous solution of the diamine is employed; however, dilute aqueous solutions containing about 0.25% or more by weight of diamine may be used if desired.

An alternate embodiment, which achieves the maximum removal of metal contaminants from the carbon bed in the most economical manner, involves treating the dibasic acid by continuously recirculating it through ion exchange resin as illustrated in Example IV below. That is, the dibasic acid is recirculated first through a bed of ion exchange resin and then through the bed of activated carbon.

The expression "relative viscosity" as used herein signifies the ratio of the flow time in a viscometer of a polymer solution containing 8.2±0.2% by weight of polymer relative to the flow time of the solvent by itself. Measurements of relative viscosity are made with 5.5 grams of polyamide in 50 milliliters of 90% formic acid at 25° C.

In the following examples, which are illustrative of methods which may be used in the practice of the present invention, all aqueous solutions are reported as percent by weight.

EXAMPLE I

Granular activated carbon (10 to 40 mesh) from wood charcoal is soaked for one hour in a 1.37% aqueous solution of adipic acid at 75° C., 6.5 pounds of solution being used per pound of carbon. The adipic acid is then drained off and the operation repeated four times giving a total of five one-hour treatments. The carbon is then rinsed by passing water at 70–75° C. through the carbon bed for one hour. The carbon is then soaked in a 1% aqueous solution of hexamethylene diamine at 75° C. for 8 hours, 6.5 pounds of solution being used per pound of carbon. This diamine solution is sufficient to neutralize the adipic acid in the carbon. At the end of this period the diamine solution is drained off and the carbon is rinsed with water at 70–75° C. as described above.

Hexamethylenediammonium adipate (66 nylon salt solution) is then passed in contact with the activated carbon and processed into high molecular weight polymer in the conventional manner. The relative viscosity of the polymer is measured periodically and found to remain substantially constant. In contrast, polymer prepared from salt solution purified with untreated carbon undergoes a decrease in relative viscosity beginning about 12 hours after the fresh carbon is put into use and continuing for several days, the maximum decrease being about 4 viscosity units. It is also observed that the treated carbon contains substantially less metal contaminants such as iron, manganese and calcium.

EXAMPLE II

A bed of granular activated carbon (10 to 40 mesh) from wood charcoal is wet with water at 50° C. A 1.37% aqueous adipic acid solution at 75° C. is passed continuously through the carbon for 2.5 hours at a rate of 0.5 gallon/cu. ft. carbon/minute. Water at 50° C. is then passed through the carbon for 0.5 hour at a rate of 0.5 gallon/cu. ft. carbon/minute. A 1% aqueous solution of hexamethylene diamine at 75° C. is then passed through the carbon for 0.5 hour at a rate of 0.5 gallon/cu. ft. carbon/minute, said amount being sufficient to neutralize the adipic acid present in the carbon. The water wash described above is then repeated. When 66 nylon salt solution is passed in contact with the washed carbon and processed into polymer as in Example I, the viscosity of the polymer remains substantially constant.

EXAMPLE III

This example illustrates the removal of calcium from activated charcoal by procedures of this invention. In each of the following tests, 10 pounds of carbon of the type used in Example II is wet with 7.5 gallons of water at 50° C. and the excess drained off. The carbon is then treated according to the following procedures:

Procedure A

The carbon is soaked for one hour in 7.5 gallons of 1.37% aqueous adipic acid soluton at 75° C. and the excess solution drained off. This procedure is repeated 4 additional times. The carbon is then briefly soaked in 7.5 gallons of water at 50° C. and the excess drained off. The carbon is then soaked for 8 hours in 7.5 gallons of a 1% aqueous solution of hexamethylene diamine at 75° C., the amount being sufficient to neutralize the adipic acid present. At the end of this period the solution is drained off and the carbon is washed by passing 30 gallons of water at 50° C. through the bed.

Procedure B

A 1.37% aqueous solution of adipic acid at 75° C. is passed through the carbon bed at a rate of 0.5 gallon/cu. ft. carbon/minute, a total of 7.5 gallons of solution being used and the solution being recycled for 30 minutes. The carbon is then washed by passing 7.5 gallons of water at 50° C. through the bed for 30 minutes at a rate of 0.5 gallon/cu. ft. carbon/minute. The adipic acid and water treatments are repeated three additional times. After the final water wash, a 1% aqueous solution of hexamethylene diamine at 75° C. is passed through the carbon at a rate of 0.5 gallon/cu. ft. carbon/minute for a period of 4 hours, the total volume of solution being 7.5 gallons and the solution being recycled. This amount of diamine solution is sufficient to neutralize the adipic acid present in the carbon. The carbon is then washed with water by passing 50° C. water through the bed for 30 minutes at 0.5 gallon/cu. ft. carbon/minute.

Procedure C

A 1.37% aqueous solution of adipic acid is passed through the wet carbon for 1 hour at a rate of 0.5 gallon/cu. ft. carbon/minute, the solution temperature being 75° C. The carbon is then washed with 50° C. water by passing 7.5 gallons through the bed at a rate of 0.5 gallon/cu. ft. carbon/minute. A 1% aqueous solution of hexamethylene diamine at 75% C. is then passed continuously through the carbon bed for 2 hours at a rate of 0.5 gallon/cu. ft. carbon/minute, said time and rate being sufficient to neutralize the adipic acid present in the carbon. The carbon is then washed with 50° C. water by passing 7.5 gallons through the bed at a rate of 0.5 gallon/cu. ft. carbon/minute.

As illustrated in the table below, analysis of the carbon before and after treatment for calcium content shows each of the procedures A, B and C to be quite effective in reducing the calcium content of the carbon. The iron and manganese contents of 66 nylon salt solution purified with the treated carbon are likewise found to be much lower than with the untreated carbon.

| Calcium content of carbon: | Percent by weight |
| --- | --- |
| Untreated | 0.8 |
| Procedure A | 0.12 |
| Procedure B | 0.13 |
| Procedure C | 0.13 |

EXAMPLE IV

A 1.4% aqueous adipic acid solution at 80° C. is circulated at a rate of 45 gallons/minute (170.3 liters/min.) through an ion exchange resin bed containing 45 cubic feet (1.27 cu. meters) of "Amberlite" (Rohm and Haas trademark for ion exchange resins) 200 cationic resin, then through a bed containing 1990 lbs. of granular activated carbon of the type disclosed in Example 1. The acid effluent from the carbon bed is returned to the ion exchange resin bed to maintain continuous recirculation of the acid solution. Analysis of the effluent from the carbon bed showed a level of 164 p.p.m. of calcium initially. At the end of seven hours, the calcium content had dropped to 1 p.p.m. Analysis of the carbon in the bed after the acid treatment showed a level of 671 p.p.m. of calcium as compared to 10,816 p.p.m. for the untreated material. After the acid treatment is completed, the carbon bed is washed with deionized water for about four hours to remove the sodium released into the system during the ion exchange operation. The carbon bed is then treated by passing 0.65% aqueous solution of hexamethylenediamine through the bed at a rate of 45 gallons/minute (170.3 liters/min.) for a period of eight hours, after which time the adipic acid present in the carbon is neutralized. The diamine solution is also recirculated, but not passed through the ion exchange resin. After the diamine treatment, the bed is again washed with deionized water for four hours. When 66 nylon salt solution is passed through the treated bed, much less of the initial effluent salt solution must be discarded due to a high level of metal contaminants than is the case with untreated carbon and considerably less salt is discarded than is the case with continuous or batch purification in the absence of the ion exchange resin treatment of the adipic acid. The ion exchange resin bed is regenerated for reuse by washing the bed with a sodium chloride solution followed by washing with deionized water.

The process of this invention effectively reduces the level of metal contamination in the nylon salt solution while at the same time eliminating the highly undesirable viscosity variation which normally occurs when the salt solution is decolorized with a fresh batch of activated carbon. As mentioned previously, the presence of manganese, iron and calcium lead to poor spinning performance and is thus deleterious to yarn properties. Also, polymer viscosity variations are very undesirable from the standpoint of producing a uniformly high quality product.

The present process may be used in the purification of any of the salt solutions prepared from diamines and dibasic acids for the production of polyamides. Salt solutions such as those prepared from the diamines and dibasic acids disclosed in U.S. 2,130,523 may be satisfactorily purified by this process. Particularly suitable for use in this process are the salt solutions prepared by the reaction of equal molar proportions of a hydrocarbon dibasic acid selected from the group consisting of adipic acid, pimelic acid, suberic acid, azelaic acid, sebacic acid, isophthalic acid, 5-tert-butylisophthalic acid and dodecandioic acid with a hydrocarbon diamine selected from the group consisting of hexamethylene diamine, paraxylylene diamine and bis-p-aminocyclohexylmethane.

Suitable ion exchange resins for use in the alternate embodiment of Example IV are well known and readily available commercially. The resin may be readily regenerated in an inexpensive fashion by washing with sodium chloride solution and water so that the material may be used many times before it is discarded.

Various changes and modifications may be made in this invention without departing from the spirit or scope thereof as defined in the following claims.

What is claimed is:

1. A process for the treatment of activated carbon intended for use in purification of a nylon salt solution formed by reaction of approximately equal molar quantities of an aliphatic dibasic acid and a diamine, which process comprises washing said activated carbon with a dilute aqueous solution, at least 0.5% by weight, of said dibasic acid and thereafter washing said activated carbon with sufficient dilute aqueous solution of said diamine to neutralize the dibasic acid present in said activated carbon, said diamine solution having a concentration of from about 0.25% up to saturation.

2. The process of claim 1 wherein said dibasic acid is one selected from the group consisting of adipic acid, pimelic acid, suberic acid, azelaic acid, sebacic acid, and dodecanedioic acid, and said diamine is one selected from the group consisting of hexamethylene diamine, paraxylylene diamine and bis-p-aminocyclohexylmethane.

3. A process for the treatment of activated carbon intended for use in purification of a nylon salt solution formed by reaction of approximately equal molar quantities of an aliphatic dibasic acid and a diamine, which process comprises passing a dilute aqueous solution, at least 0.5% by weight of said dibasic acid through a bed of said activated carbon and thereafter passing sufficient dilute aqueous solution of said diamine through said bed to neutralize the dibasic acid present in said activated carbon, said diamine solution having a concentration of from about 0.25% up to saturation.

4. In the process of purifying a nylon salt solution by contacting activated carbon therewith, said nylon salt solution being formed by reaction of an aliphatic dibasic acid and a diamine, the improvement comprising washing said activated carbon, prior to said contacting, (1) with an aqueous solution, at least 0.5% by weight, of said dibasic acid and (2) with sufficient aqueous solution of said diamine to neutralize the dibasic acid present in said activated carbon, said diamine solution having a concentration of from about 0.25% up to saturation.

5. The improvement of claim 4 wherein said dibasic acid is one selected from the group consisting of adipic acid, pimelic acid, suberic acid, azelaic acid, sebacic acid and dodecandioic acid, and said diamine is one selected from the group consisting of hexamethylene diamine, paraxylylene diamine and bis-p-aminocyclohexylmethane.

References Cited

UNITED STATES PATENTS

| 3,168,485 | 2/1965 | Knobloch et al. | 252—444 |
| 3,220,956 | 11/1965 | Cramer et al. | 252—413 |
| 3,317,424 | 5/1967 | Schmidt | 210—38 XR |

FOREIGN PATENTS

| 1,124,507 | 3/1962 | Germany. |

PATRICK P. GARVIN, *Primary Examiner.*

U.S. Cl. X.R.

210—40, 59; 252—428, 444; 260—78